Figure 6:
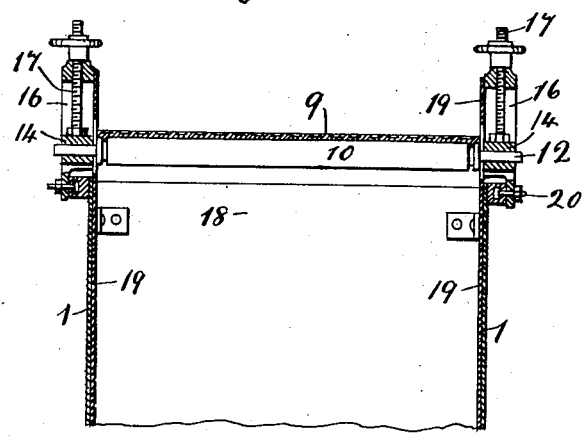

No. 813,680. PATENTED FEB. 27, 1906.
T. VICARS & J. VICARS, THE YOUNGER.
SPRINKLING GRANULAR SUBSTANCES ON DOUGH IN BISCUIT CUTTING MACHINES.
APPLICATION FILED OCT. 25, 1904.
2 SHEETS—SHEET 1.
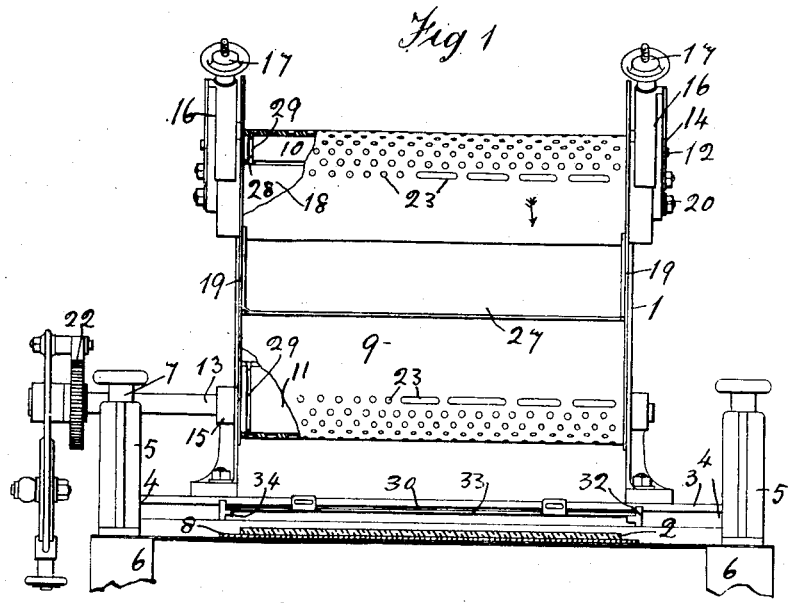
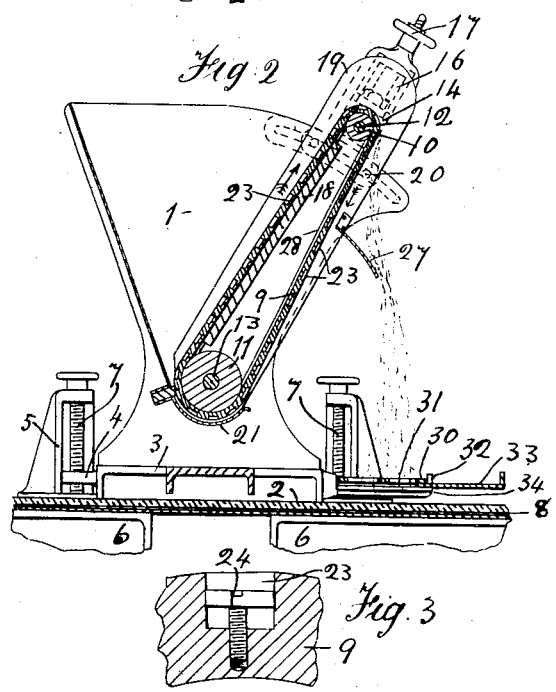
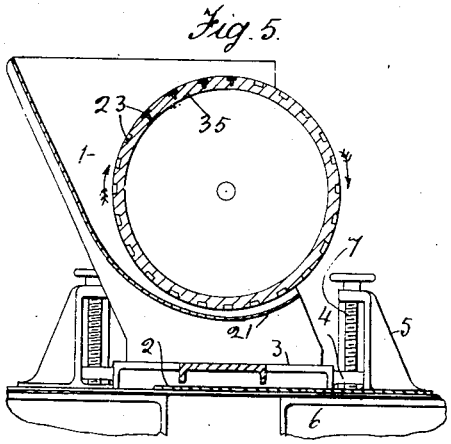
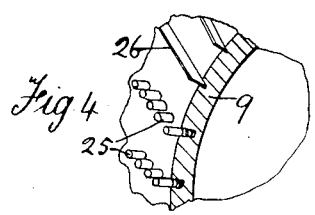
Witnesses
Inventors
Thomas Vicars
John Vicars the Younger No. 813,680. PATENTED FEB. 27, 1906.
T. VICARS & J. VICARS, THE YOUNGER.
SPRINKLING GRANULAR SUBSTANCES ON DOUGH IN BISCUIT CUTTING MACHINES.
APPLICATION FILED OCT. 25, 1904.

2 SHEETS—SHEET 2.

WITNESSES
INVENTORS
ATTORNEYS

UNITED STATES PATENT OFFICE.

THOMAS VICARS AND JOHN VICARS, THE YOUNGER, OF EARLESTOWN, ENGLAND.

SPRINKLING GRANULAR SUBSTANCES ON DOUGH IN BISCUIT-CUTTING MACHINES.

No. 813,680. Specification of Letters Patent. Patented Feb. 27, 1906.

Application filed October 25, 1904. Serial No. 229,940.

*To all whom it may concern:*

Be it known that we, THOMAS VICARS and JOHN VICARS, the Younger, subjects of the King of Great Britain, residing at Earlestown, in the county of Lancaster, England, have invented new and useful Improvements in Sprinkling Granular Substances on Dough in Biscuit-Cutting Machines, of which the following is a specification.

The object of the invention is to provide appliances whereby the sprinkling or distributing of sugar, currants, or other powdery or granular substances onto sheets of dough to form biscuits or onto dough cut out in the form of biscuits may be automatically, more efficiently, and uniformly accomplished than has been practicable hitherto.

Our invention will be clearly understood from the accompanying drawings, on which—

Figure 1 is an end view, and Fig. 2 is a longitudinal section, of appliances under the invention as applied to a biscuit-cutting machine, part of the frame and carrying-band of which is shown, the other parts being unnecessary for the purpose of this specification. Fig. 3 is a detail view. Figs. 4 and 5 are modifications. Fig. 6 is a sectional view showing the attachment of the slides 16 and plate 18 to the cheeks 19.

1 is a hopper for containing the substance to be sprinkled. The hopper is disposed above the sheet of dough 2 and preferably rests on a bar or plate 3, which has lugs 4 free to slide up or down in guides 5, supported by the main frame 6 of the biscuit-cutting machine.

7 represents screws engaging with the lugs 4, so that the bar 3, with the hopper and connections, can be raised or lowered.

8 is the dough-carrying band.

9 is an endless traveling belt or sheet or the like, the upwardly-ascending part of which is within the hopper 1 and resting on the back thereof, while the descending part is outside the hopper. The arrows show the direction of motion.

10 11 are top and bottom rollers, round which the sheet 9 passes. The shafts 12 13 of the rollers are carried in bearings 14 15, that, 14, of the top roller being movable in slides 16 and adjustable by screws 17 for regulating the tension of the sheet 9. A non-rotating adjustable bar might be used instead of the roller 11. The slide 16 and the back plate 18 of the hopper are attached to side plates or cheeks 19, pivoted on the shaft 13, so that the slope of the sheet can be varied.

20 represents set-bolts for fixing the slides 16 in the desired position.

21 is a trough partly inclosing the bottom roller 11 and sheet 9, so as to prevent leakage or spilling of the material or substance at the bottom of the hopper.

22 is ratchet-and-pawl gear for rotating the roller 11, and thus causing the sheet 9 to travel.

The surface of the belt or sheet 9 next to the substance in the hopper is formed unevenly with small pockets, grooves, or recesses 23, into which small quantities of the substance enter and as the sheet travels upward in the hopper are carried up over the top roller, whence as the sheet turns downward the substance falls out of the pockets onto the sheet of dough 2, spreading out as it falls and being distributed uniformly on the dough as such dough travels along. By varying the slope of the sheet as before mentioned the capacity of the pockets or grooves 23 is varied, so that more or less substance is taken up.

The bottom of the pockets or grooves may be movable, for instance, in the form of screws 24, as shown on enlarged scale in Fig. 3, so that by screwing these in or out the capacity of the pockets can be increased or diminished, as desired, for any class of work.

Instead of pockets, grooves, or like depressions the sheet 9 may, as shown in Fig. 4, be provided with projecting pins 25 or projecting transverse strips or bars 26. The pins or strips will carry upon their upper surfaces a certain quantity of substance and allow it to fall on their downward travel, as described for the pockets. The pins may be screwed more or less into the sheet to vary the amount of substance carried. If the dough travels intermittently, the sheet 9 should also be operated intermittently; but if the dough travels continuously then the sheet 9 should also travel continuously, spur or like gearing being used instead of the ratchet-and-pawl gearing 22. To assist in spreading the substance as it falls from the pockets, a deflecting-plate 27 may be used.

28 represents projecting guiding-strips affixed to the inner side of the belt or sheet 6 at each side, and 29 represents circumferential grooves in the top and bottom rollers 10 11, in which the strips 28 run, thus preventing the sheet 9 from moving sidewise and keeping it tight across its width and in true working position. To confine the falling substance to particular parts of the dough, we may arrange in the line of fall a plate 30, having openings 31 of any desired shape or size, through which the substance falls and coats the dough in corresponding shapes. The plate 30 is supported in any convenient way, say by arms 32, from the bar 3, or the plate 30 may be arranged to rest directly on the main frame 4. To allow of removing any of the substance that may collect on the non-perforated parts of the plate 30, such plate may be lifted off the arms 32 from time to time and another one substituted or a solid plate 33, movable in guides 34, may be slid under the plate 30 and closing the opening 31, and then all the accumulated substance may be brushed off the plate 30 without falling through the openings 31.

Fig. 5 is a sectional view of a modification under our invention. In this case instead of an endless traveling belt or sheet a large roller 35 is used, which forms the back of the hopper. The surface of the roller is formed with pockets 23 or pins 25 or strips 26, as before described, which carry the material from the hopper up over the top of the roller and then drop it on the dough.

What we claim, and desire to secure by Letters Patent, is—

1. In combination with biscuit-machines a hopper for containing the substance to be distributed, a conveyer having an uneven surface adapted to support a granular substance, the upward-moving part of the conveyer passing through the hopper while the downward-moving part passes outside the hopper, and mechanism for moving the conveyer to drop the granular substance on dough underneath the conveyer, substantially as described.

2. In combination with biscuit-machines a hopper for containing the granular substance to be distributed, an endless traveling sheet having an uneven surface passing round rollers at the top and bottom of the hopper the upward-moving part of the sheet passing through the hopper while the downward-moving part passes outside the hopper, and mechanism for moving the sheet to drop the granular substance on dough underneath the sheet, substantially as described.

3. In combination with biscuit-machines a hopper for containing the granular substance to be distributed, an endless traveling sheet having an uneven surface passing round rollers at the top and bottom of the hopper the upward-moving part of the sheet passing through the hopper while the downward-moving part passes outside the hopper, the upper roller being adjustably supported on movable side plates and the back plate of the hopper being also fixed to the side plates, and mechanism for moving the sheet to drop the granular substance on dough underneath the sheet, substantially as described.

4. In combination with biscuit-machines a hopper for containing the granular substance to be distributed, an endless traveling sheet having an uneven surface passing round rollers at the top and bottom of the hopper the upward-moving part of the sheet passing through the hopper while the downward-moving part passes outside the hopper, circumferential grooves in the rollers and guiding-strips on the inner side of the traveling sheet fitting in the grooves, and mechanism for moving the sheet to drop the granular substance on dough underneath the sheet, substantially as described.

5. In combination with biscuit-machines a hopper for containing the substance to be distributed, a conveyer having an uneven surface adapted to support a granular substance the upward-moving part of the conveyer passing through the hopper while the downward-moving part passes outside the hopper, devices for varying the supporting capacity of the uneven conveyer-surface, and mechanism for moving the conveyer to drop the granular substance on dough underneath the conveyer, substantially as described.

6. In combination with biscuit-machines a hopper for containing the substance to be distributed, a conveyer having an uneven surface adapted to support a granular substance the upward-moving part of the conveyer passing through the hopper while the downward-moving part passes outside the hopper, a perforated plate below the conveyer, a solid plate arranged to be slid under the perforated plate, and mechanism for moving the conveyer to drop the granular substance through the perforated plate onto dough underneath such plate, substantially as described.

In testimony whereof we have signed our names to this specification in the presence of two subscribing witnesses.

THOMAS VICARS.
JOHN VICARS, The Younger.

Witnesses:
W. B. Johnson,
H. Lightfoot.